A. W. DOWE.
DIFFERENTIAL CAR WHEEL.
APPLICATION FILED OCT. 13, 1913.
1,109,116.
Patented Sept. 1, 1914.
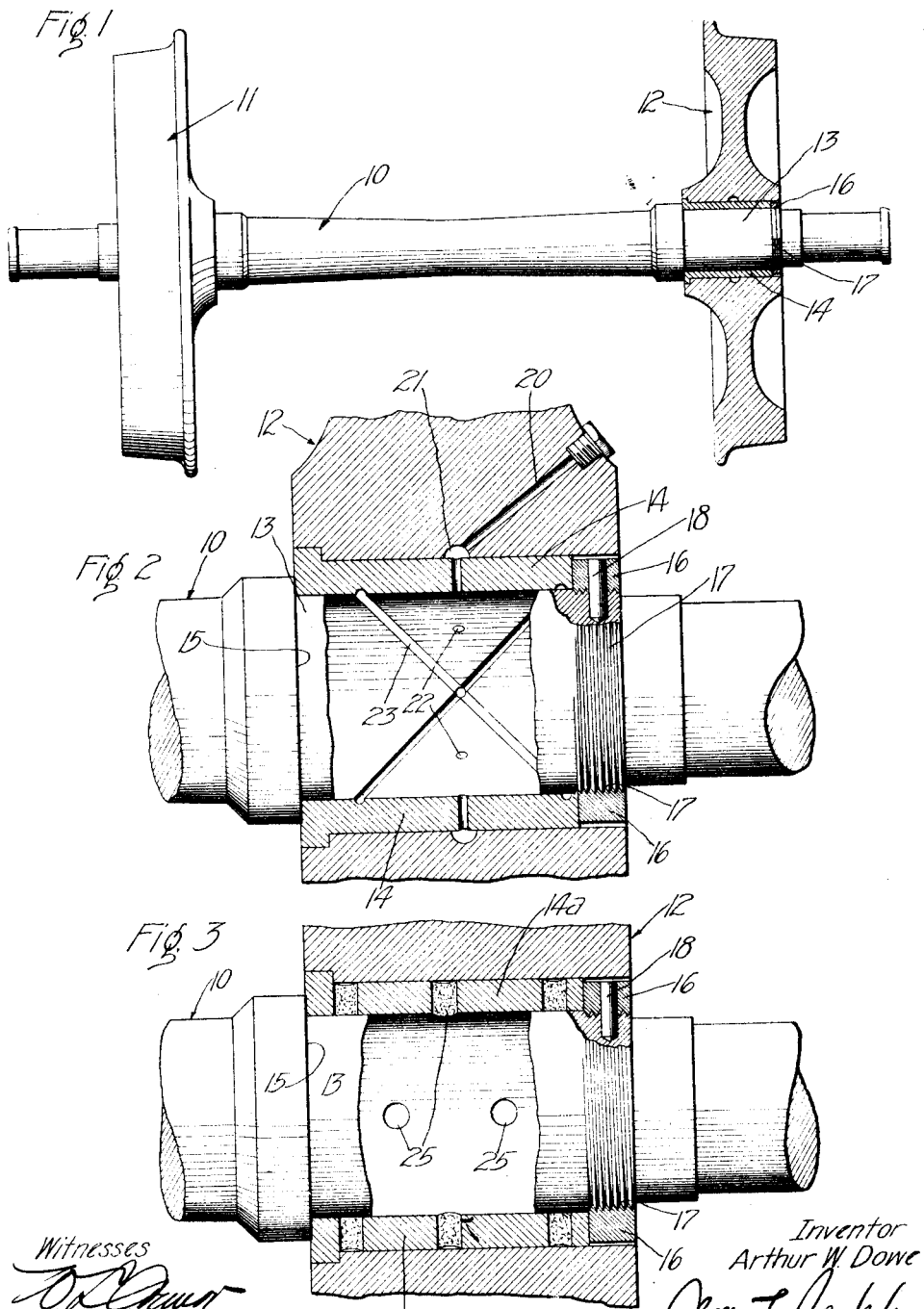
Witnesses
Inventor
Arthur W. Dowe
by his Attorney

UNITED STATES PATENT OFFICE.

ARTHUR W. DOWE, OF LOS ANGELES, CALIFORNIA.

DIFFERENTIAL CAR-WHEEL.

1,109,116.  Specification of Letters Patent.  Patented Sept. 1, 1914.

Application filed October 13, 1913. Serial No. 794,790.

*To all whom it may concern:*

Be it known that I, ARTHUR W. DOWE, a citizen of the United States, residing at Los Angeles, in the county of Los Angeles, State of California, have invented new and useful Improvements in Differential Car-Wheels, of which the following is a specification.

This invention relates to a differential construction for a car wheel or the like; and the invention has as its prime object the provision of a simple and efficient form of differential wheel for a car axle, said form involving a minimum of change in the axle and wheel from the present day construction.

Preferably, my invention includes a bearing sleeve which is rotatable on the axle, said bearing sleeve carrying the wheel; and a means for holding the bearing sleeve against longitudinal motion on the axle, said holding means being covered by the wheel itself. The bearing sleeve is first put upon the axle and the holding means then put in place; the wheel is then forced upon the bearing sleeve in the usual manner. The wheel overhangs the holding means so that it is impossible to remove the holding means while the wheel is in place. The only means by which the wheel can be removed is to force it off the bearing sleeve; and the bearing sleeve may then be removed for renewal, etc. My preferred form of holding means for the bearing sleeve is a ring screw-threaded upon the axle and held from unscrewing by a pin or equivalent. Both the ring and the pin are covered by the wheel itself; it being impossible to remove the pin or reach the ring to unscrew it until the wheel is forced off the bearing sleeve.

I explain my preferred form of device in the following specification, the same being illustrated in the accompanying drawings, in which, Figure 1 is a view showing a car axle equipped with my improved differential device, Fig. 2 is an enlarged section showing my improved differential device with one form of lubricating device. Fig. 3 is a similar section showing my improved device.

In the drawings the numeral 10 designates an ordinary car axle having one wheel 11 rigidly mounted thereon in the usual manner. The other wheel 12 I mount on the car axle in the manner of my improved device. The car axle has a wheel journal surface 13 over which I put my bearing sleeve 14. The bearing sleeve 14 is confined between shoulder 15 on the axle and a retaining ring 16 which is screw-threaded at 17 onto the axle. A pin or any equivalent member 18 holds a retaining ring 16 from unscrewing and forms the end thrust bearing for the bearing sleeve 14.

The wheel 12 is bored out to a forcing fit over the bearing sleeve 14; and after the bearing sleeve and retaining ring 16 are put in place, the wheel is forced over the bearing sleeve. The wheel overhangs from the bearing sleeve and covers the retaining ring 16 and prevents the removal of the pin 18. The ring 16 cannot be removed from the axle unless the wheel 12 is forced off the bearing sleeve; and the wheel and bearing sleeve are freely rotatable on the axle 10.

I may provide means for lubricating the sleeve, including an oil hole 20, an annular groove 21, and various holes and grooves 22 and 23 in the bearing sleeve 14. The amount of lubrication required by the bearing sleeve is comparatively small; for the amount of rotation of the bearing sleeve upon the axle is comparatively small. I may preferably provide means for inserting a charge of lubricant when the bearing sleeve and wheel are placed upon the axle, said charge being sufficient for the life of the bearing sleeve. In Fig. 3 I have shown the bearing sleeve having pockets 25 in which a suitable solid or semi-solid lubricant may be placed when the sleeve and wheel are placed upon the axle.

In the construction of my differential wheel I do not change the usual axle construction except to cut the screw-threads 17 at the end of the wheel journal surface. The only change made in the wheel is to bore it out slightly larger so as to fit over the bearing sleeve 14. The wheel can only be removed from the axle in the ordinary manner; that is, by forcing it off the part over which it fits. Bearing sleeve 14 may be made of suitable bearing metal so that it will have a considerable life. When a bearing sleeve wears out it is only necessary to remove the wheel from the sleeve, remove the sleeve and replace it with a new one, and force the wheel back into place.

I claim—

1. A car wheel and axle construction, comprising an axle having a wheel journal surface thereon, a bearing sleeve around the journal surface, means to secure the bearing sleeve against endwise motion on the axle, and a wheel rigidly mounted on the sleeve and covering the sleeve securing means to prevent its removal while the wheel is in place on the sleeve.

2. A wheel and axle construction, comprising an axle having a wheel journal surface thereon, a bearing sleeve revoluble on the journal surface, a retaining ring secured on the axle to prevent longitudinal movement of the sleeve, and a wheel rigidly mounted on the sleeve to revolve therewith on the axle, the wheel covering the sleeve retaining ring to prevent its removal while the wheel is in place on the sleeve.

3. A wheel and axle construction, comprising an axle having a wheel journal surface thereon, a bearing sleeve revoluble on the journal surface, a retaining ring screwthreaded on the axle to prevent longitudinal movement of the bearing sleeve, a pin in the ring and axle to prevent the ring from unscrewing, and a wheel rigidly mounted on the sleeve and extending over the ring and pin.

4. A wheel and axle construction, comprising an axle having a wheel journal surface thereon, a bearing sleeve revoluble on the journal surface, a retaining ring screwthreaded on the axle to prevent longitudinal movement of the bearing sleeve, a pin in the ring and axle to prevent the ring from unscrewing, and a wheel forced upon the sleeve and extending over the ring and pin.

5. A wheel and axle construction, comprising an axle having a wheel journal surface thereon, a bearing sleeve revoluble on the journal surface, a retaining ring screwthreaded on the axle to prevent longitudinal movement of the bearing sleeve, a pin in the ring and axle to prevent the ring from unscrewing, lubricant carrying pockets in the bearing sleeve, and a wheel forced upon the sleeve and extending over the ring and the pin.

In witness that I claim the foregoing I have hereunto subscribed my name this 6th day of October, 1913.

ARTHUR W. DOWE.

Witnesses:
JAS. H. BALLAGH,
JAMES T. BARKELEW.